United States Patent
LeBlanc

(10) Patent No.: US 9,733,444 B2
(45) Date of Patent: Aug. 15, 2017

(54) COMPOSITE SLICKLINE CABLE HAVING AN OPTICAL FIBER WITH OPTIMIZED RESIDUAL STRAIN

(71) Applicant: Halliburton Energy Services, Inc., Houston, TX (US)

(72) Inventor: Michel Joseph LeBlanc, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/116,417

(22) PCT Filed: Apr. 3, 2014

(86) PCT No.: PCT/US2014/032862
§ 371 (c)(1),
(2) Date: Aug. 3, 2016

(87) PCT Pub. No.: WO2015/152929
PCT Pub. Date: Oct. 8, 2015

(65) Prior Publication Data
US 2017/0010430 A1    Jan. 12, 2017

(51) Int. Cl.
*G02B 6/02* (2006.01)
*G02B 6/44* (2006.01)

(52) U.S. Cl.
CPC ......... *G02B 6/4432* (2013.01); *G02B 6/4415* (2013.01); *G02B 6/4477* (2013.01)

(58) Field of Classification Search
CPC ...... G02B 6/02395; G02B 6/443; G02B 6/02; G02B 6/4415; G02B 6/4477; C08G 18/672; C03C 25/1065; C03C 25/106
See application file for complete search history.

(56) References Cited

U.S. PATENT DOCUMENTS

| | | |
|---|---|---|
| 5,894,104 A | 4/1999 | Hedberg |
| 6,643,440 B2 | 11/2003 | Lynch et al. |
| 7,326,854 B2 | 2/2008 | Varkey |
| 8,000,572 B2 | 8/2011 | Varkey |
| 8,831,389 B2 * | 9/2014 | McCullough ............ H01B 7/14 385/101 |

(Continued)

FOREIGN PATENT DOCUMENTS

WO    WO 2006/054092 A1    5/2006

OTHER PUBLICATIONS

International Search Report and the Written Opinion of the International Search Authority, or the Declaration, Dec. 12, 2014, PCT/US2014/032862, 7 pages, ISA/KR.

(Continued)

*Primary Examiner* — Jennifer Doan
(74) *Attorney, Agent, or Firm* — Haynes and Boone, LLP

(57) ABSTRACT

A disclosed example embodiment includes a composite slickline cable having an optical fiber with optimized residual strain. The composite slickline cable includes a fiber reinforced polymer and at least one optical fiber disposed within the fiber reinforced polymer such that axial stress applied to the composite slickline cable is shared by the at least one optical fiber and the fiber reinforced polymer. In the axially unstressed state of the composite slickline cable, the at least one optical fiber has a residual strain between about −1,000 microstrain and about 500 microstrain.

20 Claims, 7 Drawing Sheets

(56) References Cited

U.S. PATENT DOCUMENTS 9,145,627 B2 *   9/2015   Wilson ................. B29C 70/025
2013/0280420 A1  10/2013  Inderberg et al.

OTHER PUBLICATIONS

Kalamkarov, et al. *On the Processing and Evaluation of Pultruded Smart Composites*, Composites Part B: Engineering, vol. 30, Issue 7, Oct. 1999, pp. 753-763.

Walther, *An Investigation of the Tensile Strength and Stiffness of Unidirectional Polymer-Matrix, Carbon-Fiber Composites Under the Influence of Elevated Temperatures* (Master's Thesis), Virginia Polytechnic Institute and State University, May 27, 1998.

* cited by examiner

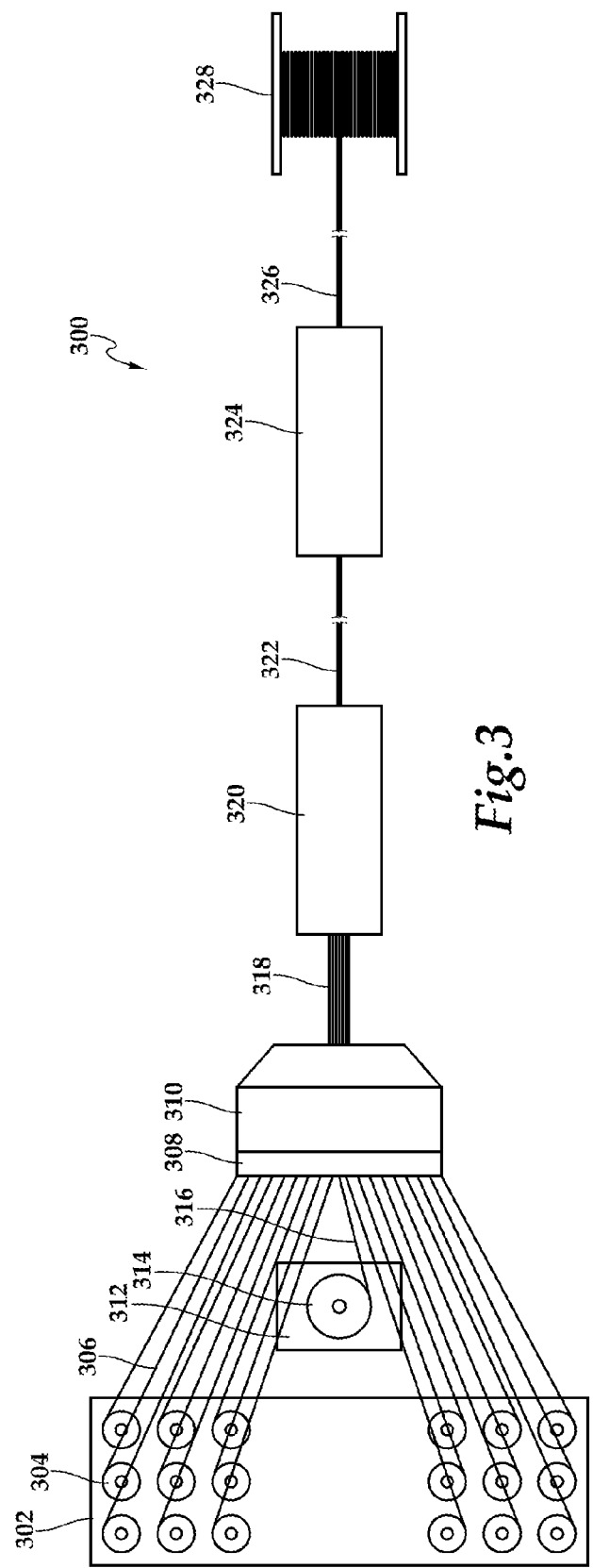

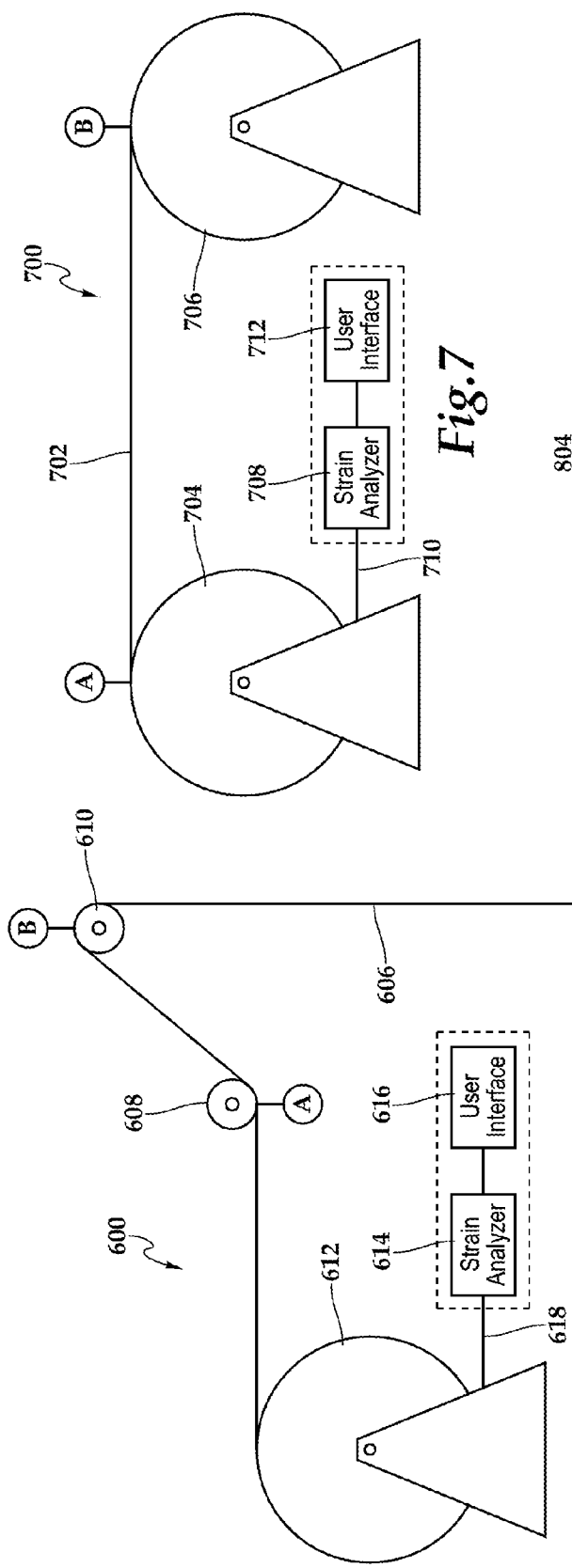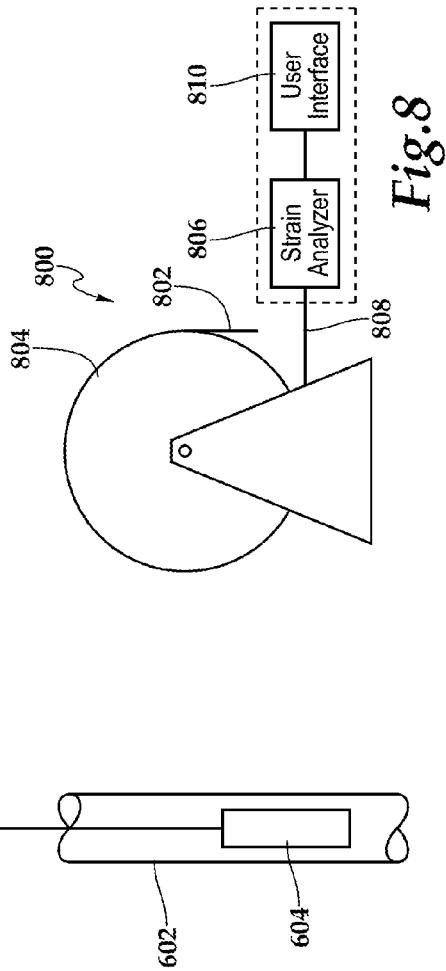

COMPOSITE SLICKLINE CABLE HAVING AN OPTICAL FIBER WITH OPTIMIZED RESIDUAL STRAIN

PRIORITY

The present application is a U.S. National Stage patent application of International Patent Application No. PCT/US2014/032862, filed on Apr. 3, 2014, the benefit of which is claimed and the disclosure of which is incorporated herein by reference in its entirety.

TECHNICAL FIELD OF THE DISCLOSURE

This disclosure relates, in general, to equipment utilized in conjunction with operations performed in relation to subterranean wells and, in particular, to a composite slickline cable having an optical fiber with optimized residual strain and a method of optimizing the residual strain in an optical fiber disposed within a composite slickline cable.

BACKGROUND

Slickline may be used to perform a variety of operations in a subterranean well. For example, slickline may be used during basic wellbore intervention operations such as depth correlation services, logging services, imaging services and fishing services. In addition, slickline may be used during more advanced operations such as perforating services, cutting services and setting services. One advantage of using slickline compared to other wellbore conveyance systems such as wireline, electric line or coiled tubing is that, due to the comparatively small size of slickline rigs, they are relatively easy to transport to and install at a well site. In addition, slickline is relatively inexpensive to maintain and operate.

As with any type of wellbore conveyance system, slickline has a limited useful life based, at least in part, on the specific operations performed by a given slickline and the particular stresses experienced by that slickline. For example, during operations, a slickline is subjected to bending stresses each time the slickline is wound on a reel or passes over a sheave. In addition, a slickline is subjected to axial stresses each time the slickline is run into a well due to gravitational forces, the weight of tools being supported by the slickline or pulling operations performed by the slickline. Further, different sections of a slickline are subjected to different stresses and different frequencies of stresses during operations, making it very difficult to track the level of stresses experienced by a slickline. This type of uncertainty is compounded as a typical slickline may be used multiple times, for multiple types of operations, by multiple slickline operating teams. Eventually, a slickline may become sufficiently fatigued and may fail if remedial actions are not undertaken prior to such failure.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIG. 3 is a schematic illustration of a pultrusion operation used during a method of optimizing the residual strain in an optical fiber disposed within a composite slickline cable according to an embodiment of the present disclosure;

FIG. 6 is a schematic illustration of a composite slickline cable being deployed in a wellbore during composite slickline cable integrity testing according to an embodiment of the present disclosure;

FIG. 7 is a schematic illustration of a composite slickline cable being transferred between two reels during composite slickline cable integrity testing according to an embodiment of the present disclosure;

FIG. 8 is a schematic illustration of a composite slickline cable having an optical fiber with optimized residual strain that is positioned on a reel during composite slickline cable integrity testing according to an embodiment of the present disclosure;

DETAILED DESCRIPTION

While various systems, methods and other embodiments are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure.

Figure 1:
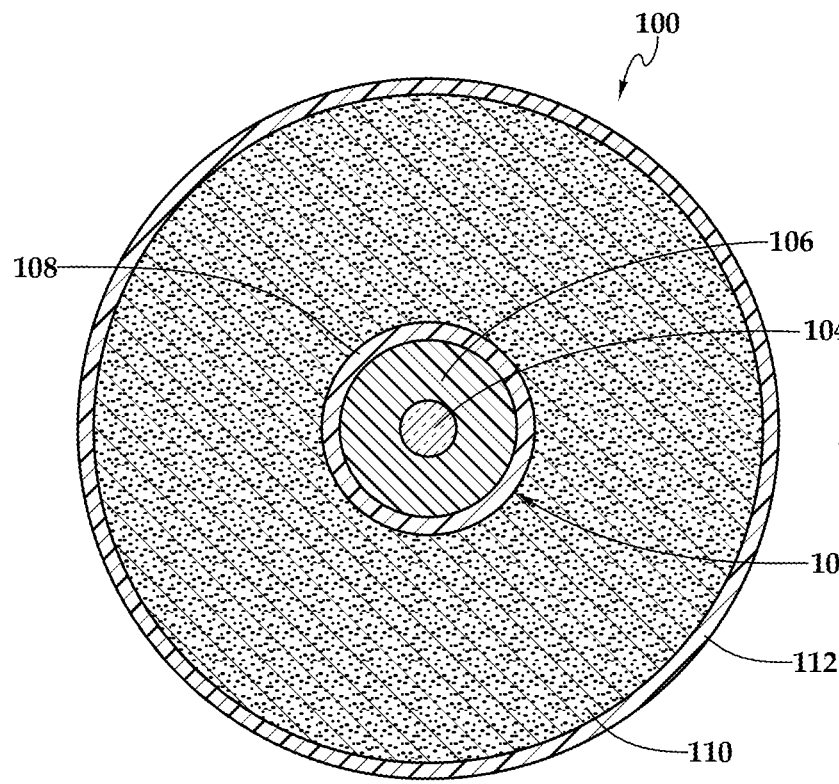
FIG. 1 is a cross sectional view of a composite slickline cable having an optical fiber with optimized residual strain according to an embodiment of the present disclosure.

FIG. 1 is a cross sectional view of a composite slickline cable 100 according to an embodiment of the present disclosure. Composite slickline cable 100 includes an optically conducting core 102 having a single optical fiber 104. In the illustrated embodiment, a coating layer 106, such as silicone coating, is disposed around optical fiber 104 and a jacket 108 formed from a thermoplastic, such as a polyether ether ketone (PEEK) polymer, is positioned around coating layer 106. Alternatively or additionally, optical fiber 104 could have a cladding layer, such as polyimide layer, disposed therearound. In the illustrated example, optically conducting core 102 may have an outside diameter of about 0.60 millimeters to about 0.90 millimeters, wherein optical fiber 104 may have an outside diameter of about 0.10 millimeters to about 0.30 millimeters and coating layer 106 may have an outside diameter of about 0.40 millimeters to about 0.60 millimeters. Optically conducting core 102 is integrally positioned within a fiber reinforced polymer 110. Fiber reinforced polymer 110 may be formed from a thermoplastic, such as a polyphenylene sulfide (PPS) polymer, having reinforcing carbon fibers disposed therein, such as long continuous carbon fibers. The carbon fibers may form between about 20 percent to about 80 percent or more of the volume of fiber reinforced polymer 110. In the illustrated embodiment, a non-abrasive smooth coating 112 formed from a thermoplastic, such as a polyether ether ketone (PEEK) polymer, may be disposed on the outer surface of fiber reinforced polymer 110. In the illustrated example, composite slickline cable 100 may have an outside diameter of about 4.064 millimeters or about 0.160 inches.

Composite slickline cable 100 will be subjected to axial stresses, particularly tensile stresses, each time composite slickline cable 100 is run into a well due to gravitational forces, the weight of tools being supported by composite slickline cable 100, pulling operations performed by composite slickline cable 100 and the like. As stated above, optically conducting core 102 is integrally positioned within fiber reinforced polymer 110 such that axial stress applied to composite slickline cable 100 is shared by fiber reinforced polymer 110 and optically conducting core 102 including optical fiber 104. One failure mode of optical fibers is the growth of surface or internal cracks, which can be accelerated by excessive tensile stress. To prevent such premature failure of optical fiber 104, in the present disclosure, residual strain in optical fiber 104 is optimized during the manufacturing process of composite slickline cable 100 to a predetermined and desirable level. For example, when composite slickline cable 100 is axially unstressed, having neither external tension nor compression applied thereto and, composite slickline cable 100 is at or near an ambient temperature between about 20 and 25 degrees Celsius, the residual strain in optical fiber 104 is at the predetermined level, such as between about −1,000 microstrain and about 500 microstrain. In certain embodiments, the predetermined level of residual strain in optical fiber 104 may be between about −1,000 microstrain and about −500 microstrain, between about −500 microstrain and about −10 microstrain, between about −200 microstrain and about 200 microstrain, between about −100 microstrain and about 100 microstrain or between about 10 microstrain and about 500 microstrain.

Figure 2:
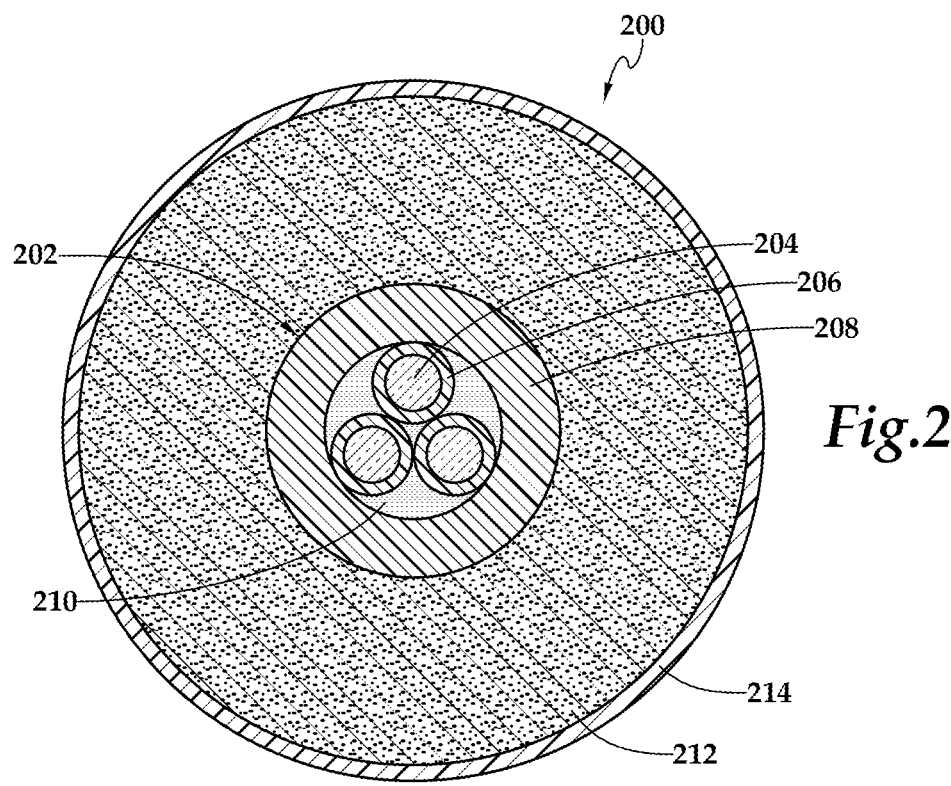
FIG. 2 is a cross sectional view of a composite slickline cable having a plurality of optical fibers with optimized residual strain according to an embodiment of the present disclosure.

FIG. 2 is a cross sectional view of a composite slickline cable 200 according to an embodiment of the present disclosure. Composite slickline cable 200 includes an optically conducting core 202 having a plurality of optical fibers 204. In the illustrated embodiment, each of the optical fibers 204 has a coating layer 206, such as a silicone coating layer, therearound.

The plurality of optical fibers 204 or fiber bundle may be disposed within a tube 208, such as a polymer tube formed from a perfluoroalkoxy alkane (PFA) polymer. An optional interstitial material 210, such as a silicone resin, may be used to fill the volume between optical fibers 204 and tube 208. In the illustrated example, optically conducting core 202 may have an outside diameter of about 0.80 millimeters to about 0.90 millimeters. Optically conducting core 202 is integrally positioned within a fiber reinforced polymer 212. Fiber reinforced polymer 212 may be formed from a thermoplastic, such as a polyphenylene sulfide (PPS) polymer, having reinforcing carbon fibers disposed therein, such as long continuous carbon fibers. In the illustrated embodiment, a non-abrasive smooth coating 214 formed from a thermoplastic, such as a polyether ether ketone (PEEK) polymer, may be disposed on the outer surface of fiber reinforced polymer 212. The carbon fibers may form between about 20 percent to about 80 percent or more of the volume of fiber reinforced polymer 212. In the illustrated example, composite slickline cable 200 may have an outside diameter of about 4.064 mm or about 0.160 inches.

Composite slickline cable 200 will be subjected to axial stresses, particularly tensile stresses, each time composite slickline cable 200 is run into a well due to gravitational forces, the weight of tools being supported by composite slickline cable 200, pulling operations performed by composite slickline cable 200 and the like. As stated above, optically conducting core 202 is integrally positioned within fiber reinforced polymer 212 such that axial stress applied to composite slickline cable 200 is shared by fiber reinforced polymer 212 and optically conducting core 202 including optical fibers 204. One failure mode of optical fibers is the growth of surface or internal cracks, which can be accelerated by excessive tensile stress. To prevent such premature failure of optical fibers 204, in the present disclosure, residual strain in optical fibers 204 is optimized during the manufacturing process of composite slickline cable 200 to a predetermined and desirable level. For example, when composite slickline cable 200 is axially unstressed, having neither external tension nor compression applied thereto and, composite slickline cable 200 is at or near an ambient temperature between about 20 and 25 degrees Celsius, the residual strain in optical fibers 204 is at the predetermined level, such as between about −1,000 microstrain and about 500 microstrain. In certain embodiments, the predetermined level of residual strain in optical fibers 204 may be between about −1,000 microstrain and about −500 microstrain, between about −500 microstrain and about −10 microstrain, between about −200 microstrain and about 200 microstrain, between about −100 microstrain and about 100 microstrain or between about 10 microstrain and about 500 microstrain.

To manufacture the composite slickline cable and achieve the desired residual strain in the optical fiber or optical fibers in the composite slickline cable of the present disclosure, a pultrusion process may be used. For example, FIG. 3 depicts a pultrusion operation 300 used in optimizing the residual strain in an optical fiber disposed within a composite slickline cable. A carbon fiber rovings station 302 includes a plurality of carbon fiber rovings 304 each having a continuous carbon fiber element 306 wound therearound. The continuous carbon fiber elements 306 are fed through a guide plate 308 and into a resin station 310 that contains a polymer resin, such as a polyphenylene sulfide (PPS) polymer resin, in a flowable state or is operable to heat continuous carbon fiber elements 306 or carbon fiber yarn preimpregnated with the polymer resin to a temperature sufficient to transition the polymer resin to a flowable state. In addition, an optical fiber station 312 includes a spool 314 having wound therearound a continuous optically conducting core element 316 such as optically conducting core 102 or optically conducting core 202 described above. Continuous optically conducting core element 316 is also fed through guide place 308 and into resin station 310.

The polymer resin coated continuous carbon fiber elements 306 and continuous optically conducting core element 316, depicted at 318, are then fed into one or more preforming, forming and curing dies, depicted as die station 320. In the curing die, the temperature is lowered to a temperature at or below the solidification temperature of the polymer resin such that a fiber reinforced polymer is formed. Die station 320 may also include a polymer coating stage in which a polymer coating, such as a polyether ether ketone (PEEK) polymer coating, is applied on the outer surface of the fiber reinforced polymer. The resulting cable, depicted at 322, is then fed through one or more pulling subassemblies, depicted as pulling station 324. Pulling station 324 and rovings station 302 are operable to apply a first tension on continuous carbon fiber elements 306 during the pultrusion process. Likewise, pulling station 324 and optical fiber station 312 are operable to apply a second tension, which is generally lower than the first tension, on continuous optically conducting core element 316 during the pultrusion process. The application of the first tension on continuous carbon fiber elements 306 creates a first strain in continuous carbon fiber elements 306 during the pultrusion process. Likewise, the application of the second tension on continuous optically conducting core element 316 creates a second strain in continuous optically conducting core element 316 during the pultrusion process. By tailoring the first and second tensions, the residual strain in the optical fiber of the composite slickline cable can be optimized, as discussed below. Following the pultrusion process, the composite slickline cable, depicted at 326, can be wound on a reel 328 for storage, transportation to a well site, deployment in a well and the like.

In tailoring the first and second tensions required to achieve the desired residual strain in the optical fiber of the composite slickline cable, numerous factors must be considered. For example, as a result of the manufacturing process of some optically conducting cores that include coatings and/or jackets around the optical fiber, the optical fiber may be in a preexisting state of residual axial stress, which may be either tensile or compressive, in the absence of any tensile load applied to the optically conducting core. Also, bringing the optically conducting core to the elevated temperature needed in resin station 310 will tend to add positive or tensile axial stress to the optical fiber resulting in elastic strain on the optical fiber in addition to the thermal strain due to the thermal expansion of the optical fiber. This added elastic strain is due to the higher coefficient of thermal expansion (CTE) of the coating and/or jacket material, for example, one or more polymers having CTEs in the range of about 20-100 microstrain per degrees Celsius, that surround the optical fiber, compared to the CTE of the optical fiber, for example, a silica having a CTE of about 0.5 microstrain per degrees Celsius. As stated above, the first tension applied to the continuous carbon fiber elements and the second tension applied to the continuous optically conducting core element during the pultrusion process are independent of each other such that the tensile elastic strain in the continuous carbon fiber elements and the continuous optically conducting core can be separately adjusted. Preferably, these tensions are applied prior to heating the continuous carbon fiber elements and the continuous optically conducting core and may be applied at the same time.

It is noted that while the temperature in resin station 310 will exceed the solidification temperature of the polymer, for example, the resin station temperature may be 25 to 75 degrees Celsius higher than the solidification temperature of the polymer, this does not affect the mechanics of continuous carbon fiber elements or the continuous optically conducting core. A change occurs only when the solidification temperature of the polymer is reached during the solidification and cooling process. The tensions are preferably maintained during the heating, solidification and cooling processes. Subsequently, the tension, which is now applied to the composite slickline cable as a cohesive unit, is released so that essentially no tension is present in the composite slickline cable in section 326 or on reel 328. At this point, the composite slickline cable is in its axially unstressed state, having neither external tension nor compression applied thereto, and the composite slickline cable is at or near an ambient temperature between about 20 and 25 degrees Celsius. In this state, the predetermined residual strain in the optical fiber is established.

Figure 4A:
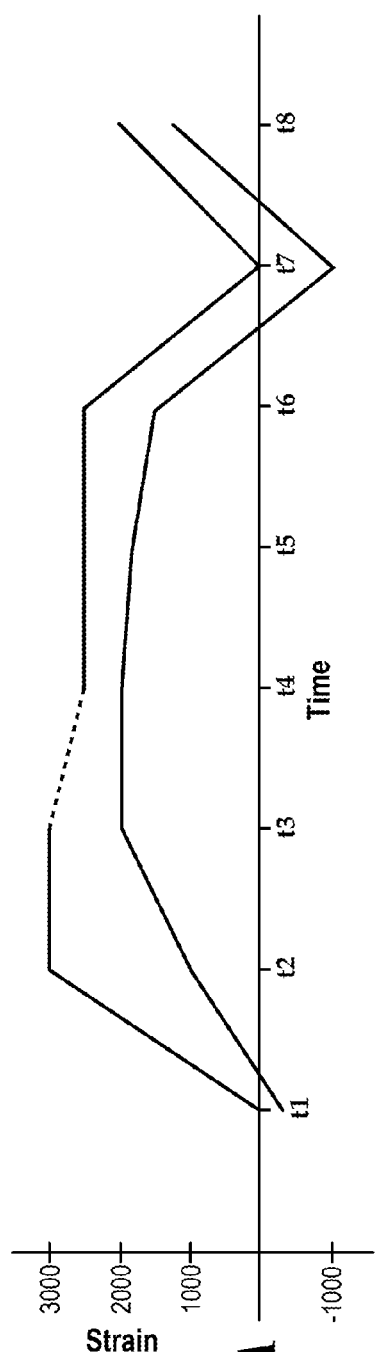
FIG. 4A is a strain versus time graph during a method of optimizing the residual strain in an optical fiber disposed within a composite slickline cable according to an embodiment of the present disclosure.
Figure 4B:
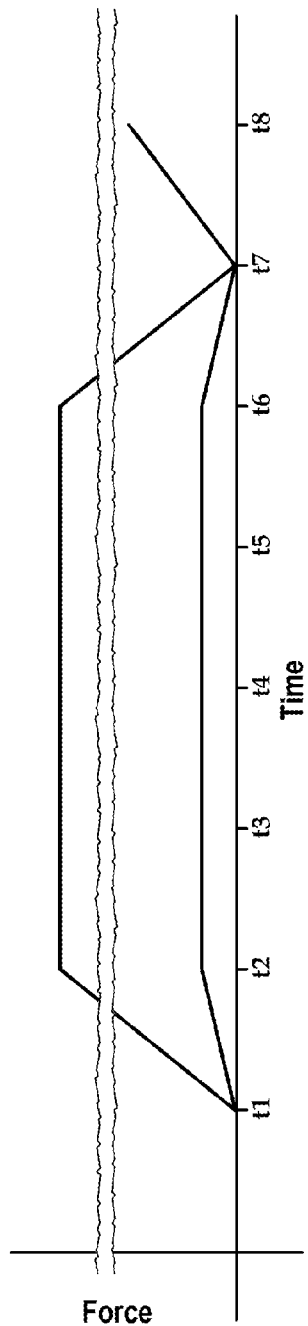
FIG. 4B is a force versus time graph during a method of optimizing the residual strain in an optical fiber disposed within a composite slickline cable according to an embodiment of the present disclosure.
Figure 4C:
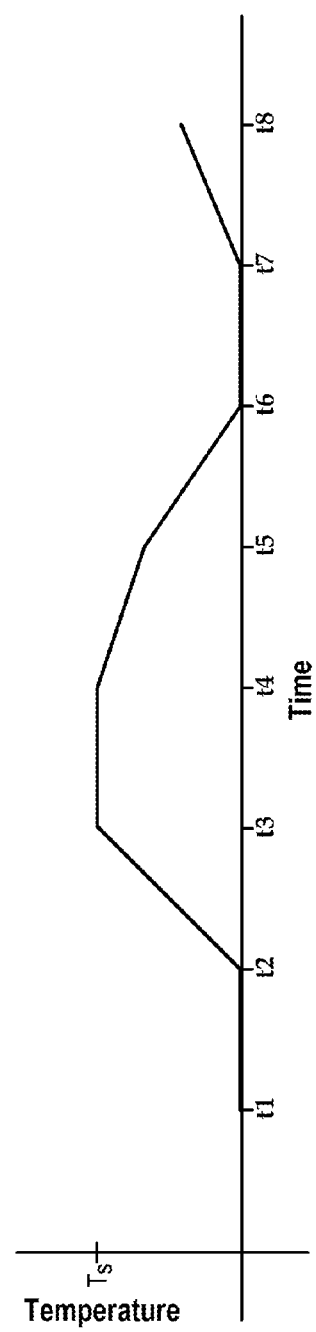
FIG. 4C is a temperature versus time graph during a method of optimizing the residual strain in an optical fiber disposed within a composite slickline cable according to an embodiment of the present disclosure.

Referring additionally to FIGS. 4A-4C, eight time frames are relating to the process of optimizing the residual strain in an optical fiber disposed within a composite slickline cable, wherein FIG. 4A is an elastic strain versus time graph, FIG. 4B is a force versus time graph and FIG. 4C is a temperature versus time graph. The upper curve in FIG. 4A represents strain in the continuous carbon fiber elements from time t1 to time t3 and in the fiber reinforced polymer from time t4 to time t8 with the transition from the continuous carbon fiber elements to the fiber reinforced polymer represented by the dashed line between time t3 and time t4. The lower curve in FIG. 4A represents strain in the optical fiber. The strain in FIG. 4A is in microstrain. The upper curve in FIG. 4B represents the force applied to the continuous carbon fiber elements and the lower curve represents the force applied to the continuous optically conducting core. In FIG. 4C, the designation Ts represents the solidification temperature of the polymer.

Time t1 represents a time prior to applying tension to the continuous carbon fiber elements or the continuous optically conducting core element and prior to applying heat to the continuous carbon fiber elements or the continuous optically conducting core element. At time t1, FIG. 4A shows no strain on the continuous carbon fiber elements and −250 microstrain on the optical fiber, which represents a preexisting state of residual axial compression on the optical fiber applied by the coatings and/or jackets of the optically conducting core. FIG. 4B shows no force being applied to the continuous carbon fiber elements and no force being applied to the continuous optically conducting core. FIG. 4C shows the temperature at ambient room conditions, for example, between about 20 and 25 degrees Celsius.

Time t2 represents a time when the first tension is applied to the continuous carbon fiber elements and the second tension is applied to the continuous optically conducting core element. FIG. 4A shows the resulting strain in the continuous carbon fiber elements and the optical fiber. FIG. 4B shows the first force applied to the continuous carbon fiber elements that generates the resulting strain in the continuous carbon fiber elements and the second force applied to the continuous optically conducting core element that generates the resulting strain in the optical fiber. The first force is higher than the second force in the illustrated example. FIG. 4C shows the temperature at ambient room conditions, for example, between about 20 and 25 degrees Celsius.

Time t3 represents a time just prior to solidification of the polymer resin, for example, at a time after the continuous carbon fiber elements and the continuous optically conducting core element have passed through the resin station 310 and have entered the die station 320. It is noted that for a time period prior to t3, the temperature of the system will be above Ts but for the analysis discussed herein, it is not necessary to display this time period. It is noted that just prior to time t3, the temperature of polymer resin will decrease from a temperature above Ts to Ts without crossing Ts thus, the temperature is on a downward temperature slope at this time period. FIG. 4A shows that the resulting elastic strain in the continuous carbon fiber elements has remained constant from time t2 because, by definition, elastic strain is the component of strain due to stress and here the axial stress on the continuous carbon fiber elements has not changed because the tension on the continuous carbon fiber elements is maintained constant. In contrast, the elastic strain in the optical fiber does change from time t2 due to a higher CTE of the coating and/or jacket material of the continuous optically conducting core element relative to the CTE of the optical fiber, thus causing tension in the optical fiber. FIG. 4B shows that the first force applied to the continuous carbon fiber elements has remained constant and the second force applied to the continuous optically conducting core element has remained constant. FIG. 4C shows the temperature at Ts of the polymer, for example, between about 260 and about 300 degrees Celsius.

Time t4 represents a time just after solidification of the polymer, for example, at a location within a curing die of die station 320. FIG. 4A shows that the resulting elastic strain in the continuous carbon fiber elements has reduced from time t3 due to the transition from the properties of the continuous carbon fiber elements alone to the properties of the fiber reinforced polymer. FIG. 4A also shows that the resulting strain on the optical fiber has remained constant. FIG. 4B shows that the first force applied to the continuous carbon fiber elements and now the fiber reinforced polymer has remained constant and the second force applied to the continuous optically conducting core element has remained constant. FIG. 4C shows the temperature at Ts of the polymer, for example, between about 260 and 300 degrees Celsius.

Time t5 represents a time after solidification of the polymer partway down the temperature cycle to ambient room conditions but still above ambient room conditions. FIG. 4A shows that the resulting elastic strain in the fiber reinforced polymer has remained constant from time t4 as no change in the tension on the fiber reinforced polymer has occurred and that the elastic strain on the optical fiber has decreased from time t4 due to a slightly lower CTE of the optical fiber material relative to the CTE of the fiber reinforced polymer. FIG. 4B shows that the first force applied to the fiber reinforced polymer has remained constant and the second force applied to the continuous optically conducting core element has remained constant. FIG. 4C shows the temperature at a point between Ts and ambient room conditions.

Time t6 represents a time after solidification and cooling to ambient room conditions. FIG. 4A shows that the resulting elastic strain in the fiber reinforced polymer has remained constant from time t5 as no change in the tension on the fiber reinforced polymer has occurred and that the elastic strain on the optical fiber has decreased from time t5 due to a slightly lower CTE of the optical fiber material relative to the CTE of the fiber reinforced polymer. FIG. 4B shows the first force applied to the fiber reinforced polymer has remained constant and the second force applied to the continuous optically conducting core element has remained constant. FIG. 4C shows the temperature at ambient room conditions, for example, between about 20 and 25 degrees Celsius.

Time t7 represents a time after solidification, the temperature remaining at ambient room conditions and the release of the first and second tensions. FIG. 4A shows no strain on the fiber reinforced polymer and −1000 microstrain on the optical fiber, which represents the optimized residual strain in the optical fiber in this example. FIG. 4B shows no force being applied to the fiber reinforced polymer and no force being applied to the continuous optically conducting core element. FIG. 4C shows the temperature at ambient room conditions, for example, between about 20 and 25 degrees Celsius. As illustrated, the elastic strain in the optical fiber and in the fiber reinforced polymer has reduced by the same amount from t6 because the fiber reinforced polymer and optical fiber are, since the time of solidification, an integral unit so that the change in elastic strain from the release of the first and second tensions affects both components equally in a purely mechanical function as thermal stresses and strain do not play a role at this time period.

Time t8 represents a time when the composite slickline cable is being deployed in a well to perform slickline services. FIG. 4A shows the resulting strain in the fiber reinforced polymer and the resulting strain on the optical fiber. FIG. 4B shows a force that is applied to the composite slickline cable that is shared by the fiber reinforced polymer and the optical fiber. FIG. 4C shows the wellbore temperature. As can be seen in FIG. 4A, even though the optical fiber is integrally positioned within the fiber reinforced polymer such that the composite slickline cable acts as a single unit, the slope of the elastic strain curve is slightly higher for the optical fiber compared to the fiber reinforced polymer due to the slightly higher CTE of the fiber reinforced polymer compared to the CTE of the optical fiber which tends to add tension in the optical fiber as the temperature increases.

While numerous variables are involved in establishing the optimized residual strain in the optical fiber of the composite slickline cable, once the various component parts are selected, the only remaining variables at the pultrusion phase are the first and second tensions. Specifically, once the various components are selected, the corresponding CTEs are known and the Ts of the polymer is known. In addition, any preexisting residual axial strain on the optical fiber applied by the coatings and/or jackets of the optically conducting core is known.

Following the manufacturing process, the residual strain in the optical fiber in an unstressed composite slickline cable at ambient room conditions can be expressed as follows:

$$\varepsilon = \Delta\epsilon + \epsilon fo + (\alpha oc - \alpha frp)(Ts - Ta);$$

where, $\Delta\varepsilon$ is the difference between the first and second strains at time t3;

where, $\varepsilon fo$ is the preexisting residual axial strain on the optical fiber;

where, $\alpha oc$ is the CTE of the coating/jacket of the optically conducting core;

where, $\alpha frp$ is the CTE of the fiber reinforced polymer;

where, Ts is the solidification temperature of the polymer; and where, Ta is the ambient room temperature.

To optimize the residual strain in the optical fiber between about −1,000 microstrain and about 500 microstrain, for example, the maximum and minimum differences between the first and second strains at time t3 can be expressed as follows:

$$\Delta\varepsilon_{min} = -500 \text{ microstrain} + \varepsilon fo + (\alpha oc - \alpha pm)(Ts - Ta);$$

$$\Delta\varepsilon_{max} = 1000 \text{ microstrain} + \varepsilon fo + (\alpha oc - \alpha pm)(Ts - Ta);$$

In this manner, a predetermined residual strain may be established in one or more optical fibers that are integrally disposed within the fiber reinforced polymer that form a composite slickline cable. The optimized residual strain is achieved in the pultrusion process by independently applying the first tension to the continuous carbon fiber elements and the second tension to the continuous optically conducting core element. By selecting the first and second tensions to have a difference between the upper and lower limits discussed above, the desired predetermined residual strain may be established.

In addition to adjusting the first and second tensions to establish the predetermined residual strain in the optical fiber, several optional steps may be taken to aid in achieving the desired residual strain. For example, in order to counteract the strain in the optical fiber generated during the heating process between times t2 and t3, the continuous optically conducting core element may be placed in contact with some of the continuous carbon fiber elements to create a friction relationship therebetween. Upon entering the heating phase of the pultrusion process, the friction between the continuous carbon fiber elements and the continuous optically conducting core element will tend to reduce the normal axial expansion of the outer jacket of the continuous optically conducting core element due to the lower CTE of the continuous carbon fiber elements, thereby reducing the tensile strain applied to the optical fiber by the outer jacket during heating.

Figure 5:
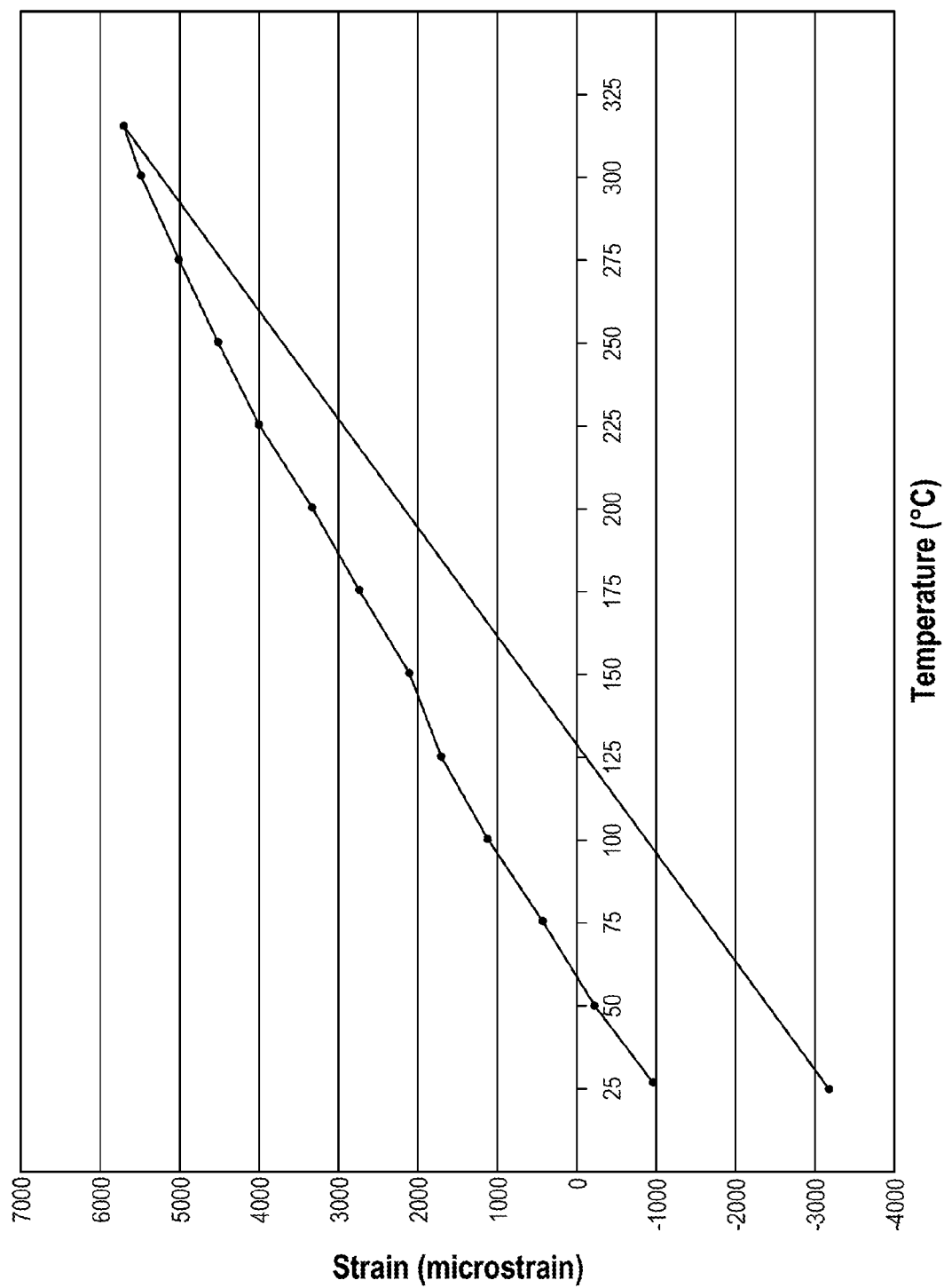
FIG. 5 is a strain versus temperature graph during heat cycling of an optical fiber according to an embodiment of the present disclosure.

The effects of thermal expansion can be further altered by cooling the continuous optically conducting core element prior to create the friction relationship between the continuous optically conducting core element and some of the continuous carbon fiber elements. The cooling can be achieved by passing the continuous optically conducting core element through a bath of low temperature fluid, such as nitrogen, at optical fiber station 312. Alternatively or additionally, the preexisting residual axial strain on the optical fiber applied by the coatings and/or jackets of the optically conducting core can be adjusted. For example, as best seen in FIG. 5, heat cycling the continuous optically conducting core can alter the residual axial strain on the optical fiber. In the illustrated example, the original preexisting residual axial strain is approximately −1000 microstrain. The temperature of the continuous optically conducting core is then raised from 25 to 325 degrees Celsius in 25 degree increments. Thereafter, the continuous optically conducting core is allowed to return to 25 degrees Celsius. In the illustrated example, the adjusted preexisting residual axial strain is approximately −3200 microstrain. The heat cycling process can be repeated to further refine the adjusted preexisting residual axial strain. It should be noted that the heat cycling process can affect the effective CTE of the optically conducting core and the post-process value should be used in the analysis provided above.

Once a composite slickline cable begins its service life, it is important to monitor and assess the integrity of the composite slickline cable over time such that fatigue or other failure modes do not occur. For example, as seen in FIG. 6, a composite slickline cable being deployed in a wellbore is undergoing composite slickline cable integrity testing according to an embodiment of the present disclosure. A well system 600 includes a wellbore 602 having a tool 604 deployed therein on a composite slickline cable 606. Composite slickline cable 606 is being deployed from a slickline rig including lower sheave 608, upper sheave 610 and reel 612. As described above, composite slickline cable 606 may have an outer diameter of about 0.160 inches such that a conventional slickline rig may be used. Also, as described above, composite slickline cable 606 includes one or more optical fibers such as optical fiber 104 or optical fibers 204. Preferably, at a fixed end of composite slickline cable 606, an optical analyzer 614 is optically coupled to at least one of the optical fibers of composite slickline cable 606 via a communication medium 618, which may include an optical slip-ring at the hub of reel 612. In the illustrated embodiment, optical analyzer 614 is operably associate with a user interface 616 such as a visual input/output device as well as other input/output devices such as keyboards, keypads, pointer devices, control switches, control knobs and the like, which may be integral with optical analyzer 614, as indicated by the dashed lines. Alternatively, all or part of user interface 616 may be colocated with or remote from optical analyzer 614 and communicably coupled thereto via a wired or wireless communications protocol or other information sharing technique.

Optical analyzer 614 is operable to send optical signals, such as laser signals including laser pulses, into the optical fibers of composite slickline cable 606 and receive optical feedback, such as backscattered light including Rayleigh scattering and Fresnel reflections, from the optical fibers of composite slickline cable 606. For example, optical analyzer 614 may be an optical time domain reflectometer (OTDR), an optical frequency domain reflectometer (OFDR), a Brillouin optical time domain reflectometer (BOTDR) or similar device. Optical analyzer 614 and/or user interface 616 may contain various control subsystems such as a computer control subsystem including various blocks, modules, elements, components, methods or algorithms, that can be implemented using computer hardware, software, combinations thereof and the like. The computer hardware can include a processor configured to execute one or more sequences of instructions, programming stances or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network or any like suitable entity that can perform calculations or other manipulations of data. A computer-readable medium can take on many forms including, for example, non-volatile media, volatile media and transmission media. Non-volatile media can include, for example, optical and magnetic disks. Volatile media can include, for example, dynamic memory. Transmission media can include, for example, coaxial cables, wire, fiber optics and wires that form a bus. Common forms of computer-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM. Alternatively, some or all of the control systems may be located remote from optical analyzer 614 and/or user interface 616 and communicate therewith via a wired or wireless communications protocol.

In operation, optical analyzer 614 is used to interrogate the optical fibers of composite slickline cable 606 to identify any local variations in the optical fibers when the optical fibers are in an axially stressed state, which may be tension or compression. Specifically, optical analyzer 614 sends optical signals into the optical fibers of composite slickline cable 606 and receives optical feedback from the optical fibers of composite slickline cable 606. The optical analyzer 614 uses the optical feedback to indicate the condition of the optical fibers inside of composite slickline cable 606. For example, one optical measurement of interest is the signal attenuation profile along the optical fiber, which can be measured using an OTDR, a BOTDR or an OFDR. Damage to composite slickline cable 606 can be identified by localized changes of signal attenuation along the optical fiber as detected by optical analyzer 614. As another example, the strain profile in the optical fiber can be determined using an OFDR or a BOTDR and, in particular, localized variations of strain in the optical fiber can be identified.

In general, anomalies or local variations in one or more optical fiber parameters such as signal attenuation or strain in the optical fibers may be used in determining the condition of the optical fibers inside of composite slickline cable 606, which in turn can be used in determining the condition of composite slickline cable 606 itself. For example, if any of the local variations in the optical fiber identified by optical analyzer 614 exceeds a predetermined threshold, this may indicate a loss of composite slickline cable integrity. Such identified local variations in the optical fiber may be indicated as a real time warning signal from optical analyzer 614 and/or user interface 616. Alternatively or additionally, data associated with the identified local variations may be stored by optical analyzer 614 and/or other storage means for subsequent automated or manual analysis thereof. For example, if the optical feedback from an optical fiber received by optical analyzer 614 indicates a localized spike in strain in the optical fiber, this could be an indication of damage in the fiber reinforced polymer such as fibrillation, loss of cohesion in the transverse direction or other failure mode. Such a localized spike may be exhibited as either an increase in strain or a decrease in strain compared to the surrounding generally uniform strain profile in the optical fiber. In the illustrated embodiment, strain variations in an optical fiber can be measured by optical analyzer 614 in the section of composite slickline cable 606 between lower sheave 608 and upper sheave 610 as composite slickline cable 606 is being deployed in or retracted from wellbore 602. This configuration can be particularly advantageous as the section of composite slickline cable 606 between lower sheave 608 and upper sheave 610 will have tensile stress therein and a known temperature environment. As composite slickline cable 606 is being deployed in or retracted from wellbore 602, the composite slickline cable 606 moves through lower sheave 608 and upper sheave 610 such that a long section of composite slickline cable 606 may be analyzed by optical analyzer 614 during a slickline service.

Figure 9:
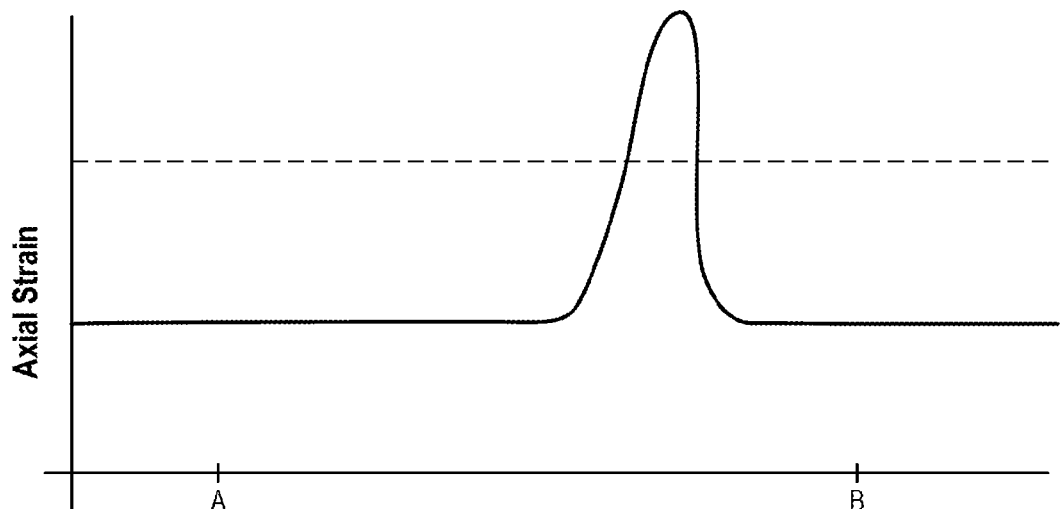
FIG. 9 is a strain versus position graph during composite slickline cable integrity testing according to an embodiment of the present disclosure.

FIG. 9 is a strain versus position graph generated during composite slickline cable integrity testing according to an embodiment of the present disclosure. This graph represents a section of composite slickline cable 606 between lower sheave 608 and upper sheave 610, which are also denoted as locations A and B. At any given time during the operation of the composite slickline cable 606, the curve in FIG. 9 indicates the axial strain in the optical fiber in the section of composite slickline cable 606 between lower sheave 608 and upper sheave 610. In the illustrated embodiment, the curve in FIG. 9 indicates a strain variation that exceeds a predetermined threshold indicated by the horizontal dashed line. When such a strain variation is identified by optical analyzer 614, the location of the strain variation along the optical fiber is determined by optical analyzer 614 based upon timing information associated with the optical feedback from the optical fibers received by optical analyzer 614. Software or other automated or manual techniques may then be used to correlate the strain variation location in the optical fiber to the corresponding axial location along composite slickline cable 606 such that a further inspection of composite slickline cable 606 proximate the determined axial location can be conducted.

Figure 10:
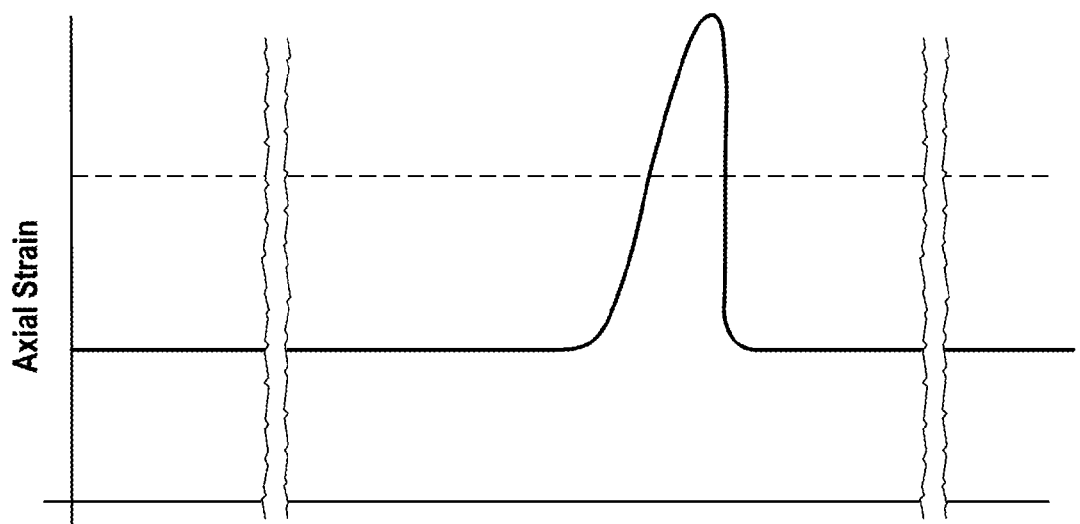
FIG. 10 is a strain versus position graph during composite slickline cable integrity testing according to an embodiment of the present disclosure.

Alternatively or additionally, strain variations in an optical fiber can be measured in all portions of composite slickline cable 606 that are in tension due to deployment of tool 604 in wellbore 602. Again, optical analyzer 614 is used to interrogate the optical fibers of composite slickline cable 606 to identify any strain variations in the optical fibers when the optical fibers are in tension. Specifically, optical analyzer 614 sends optical signals into the optical fibers of composite slickline cable 606 and receives optical feedback from the optical fibers of composite slickline cable 606 that indicate strain and variations in strain in the optical fibers. For example, FIG. 10 is a strain versus position graph generated during composite slickline cable integrity testing according to an embodiment of the present disclosure. This graph represents the entire length of the optical fiber and can provide valuable feedback from at least the portion of the optical fiber that is in tension. In the illustrated example, the curve in FIG. 10 shows relatively constant axial strain in the optical fiber with the exception of a strain variation that exceeds the predetermined threshold indicated by the horizontal dashed line. Following the identification of such a strain variation by optical analyzer 614, the location of the strain variation along the optical fiber is determined by optical analyzer 614 based upon timing information associated with the optical feedback from the optical fibers received by optical analyzer 614. Software or other automated or manual techniques may then be used to correlate the strain variation location in the optical fiber to the corresponding axial location along composite slickline cable 606 such that a further inspection of composite slickline cable 606 proximate the determined axial location can be conducted.

In addition to well site monitoring of composite slickline cable integrity, a composite slickline cable may be inspected prior to being sent out for a slickline operation. For example, as seen in FIG. 7, a composite slickline cable being transferred between two reels during composite slickline cable integrity testing according to an embodiment of the present disclosure. A test operation 700 includes a composite slickline cable 702 that is being transferred from reel 704 to reel 706. Composite slickline cable 702 includes one or more optical fibers such as optical fiber 104 or optical fibers 204 described above. Preferably, at a fixed end of composite slickline cable 702, an optical analyzer 708 is optically coupled to at least one of the optical fibers of composite slickline cable 702 via a communication medium 710 which may include an optical slip-ring at the hub of reel 704. In the illustrated embodiment, a user interface 712 is operably associated with optical analyzer 708.

In operation, optical analyzer 708 is used to interrogate the optical fibers of composite slickline cable 702 to identify any local variations in one or more optical fiber parameters when the optical fibers are in an axially stressed state. Specifically, optical analyzer 708 sends optical signals into the optical fibers of composite slickline cable 702 and receives optical feedback from the optical fibers of composite slickline cable 702 that indicate, for example, strain and variations in strain in the optical fibers or variations in signal attenuation along the optical fibers. If any of the identified variations exceeds a predetermined threshold, this may indicate a loss of composite slickline cable integrity. In the illustrated embodiment, such variations in an optical fiber can be measured by optical analyzer 708 in the section of composite slickline cable 702 that is in tension between reel 704 and reel 706 as composite slickline cable 702 is transferred therebetween. This configuration can be particularly advantageous as physical inspection of composite slickline cable 702 may occur immediately upon identification of any strain variation that exceeds a predetermined threshold, if desired.

The graph of FIG. 9 may represent the section of composite slickline cable 702 between reel 704 and reel 706, which are also denoted as locations A and B. At any given time, the curve in FIG. 9 indicates the axial strain in the optical fiber in the section of composite slickline cable 702 between reel 704 and reel 706. In the illustrated embodiment, the curve in FIG. 9 indicates a strain variation that exceeds a predetermined threshold indicated by the horizontal dashed line. When such a strain variation is identified by optical analyzer 708, the location of the strain variation is determined by optical analyzer 708 based upon timing information associated with the optical feedback from the optical fibers received by optical analyzer 708. Software or other automated or manual techniques may then be used to correlate the strain variation location in the optical fiber to the corresponding axial location along composite slickline cable 702 such that a further inspection of composite slickline cable 702 proximate the determined axial location can be conducted.

FIG. 8 is a schematic illustration of a composite slickline cable having an optical fiber with optimized residual strain that is positioned on a reel during composite slickline cable integrity testing according to an embodiment of the present disclosure. In this embodiment, the composite slickline cable need not be tensioned in order to perform composite slickline cable integrity testing. A test operation 800 includes a composite slickline cable 802 that is positioned on a reel 804. Composite slickline cable 802 includes one or more optical fibers such as optical fiber 104 or optical fibers 204 described above that have optimized residual strain as described above. Preferably, at a fixed end of composite slickline cable 802, an optical analyzer 806 is optically coupled to at least one of the optical fibers of composite slickline cable 802 via a communication medium 808 which may include an optical slip-ring at the hub of reel 804. In the illustrated embodiment, a user interface 810 is operably associated with optical analyzer 806.

In operation, optical analyzer 806 is used to interrogate the optical fibers of composite slickline cable 802 to identify both strain variations and signal attenuation variations in the optical fibers when composite slickline cable 802 is in its relaxed or axially unstressed state but while the optical fibers have residual strain therein, which may be either tensile or compressive. Specifically, optical analyzer 806 sends optical signals into the optical fibers of composite slickline cable 802 and receives optical feedback from the optical fibers of composite slickline cable 802 that indicates strain variations and signal attenuation variations in the optical fibers. If any of the identified variations exceeds a predetermined threshold, this may indicate a loss of composite slickline cable integrity. In this embodiment, strain variations and signal attenuation variations along the entire length of an optical fiber can be measured due to the residual strain therein.

Figure 11A:
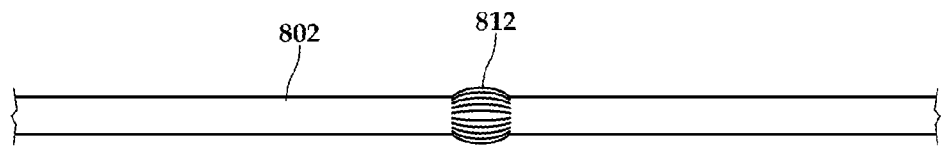
FIG. 11A is a side view of a portion of a composite slickline cable during integrity testing according to an embodiment of the present disclosure.
Figure 11B:
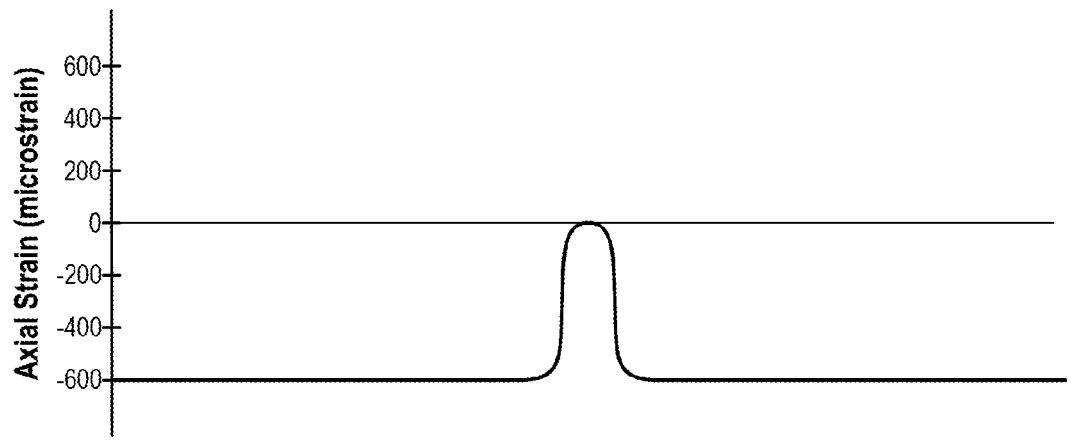
FIG. 11B is a strain versus position graph during composite slickline cable integrity testing according to an embodiment of the present disclosure.
Figure 11C:
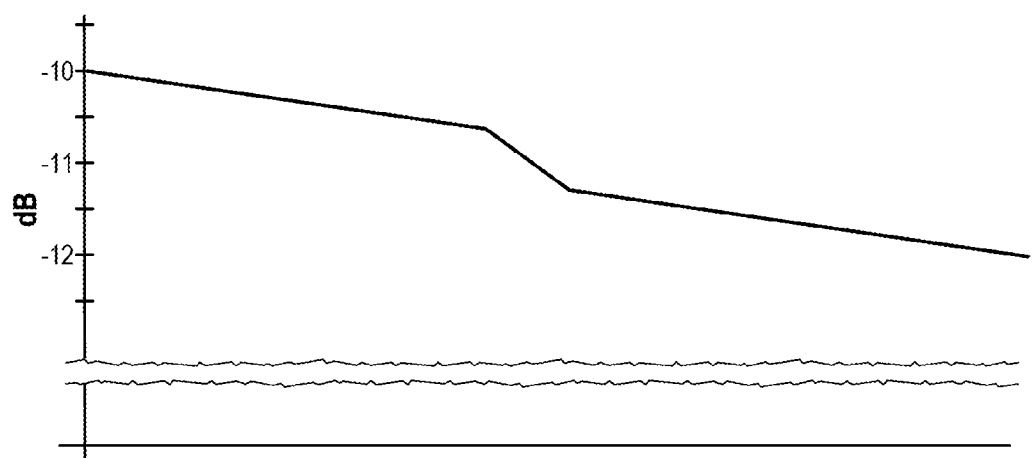
FIG. 11C is a signal attenuation versus position graph during composite slickline cable integrity testing according to an embodiment of the present disclosure.

Referring additionally to FIGS. 11A-11C, a section of composite slickline cable 802 and associated graphs are depicted during composite slickline cable integrity testing according to an embodiment of the present disclosure. As best seen in FIG. 11A, the illustrated section of composite slickline cable 802 has a damaged portion indicated at 812 which may be, for example, fibrillation of the fiber reinforced polymer of composite slickline cable 802. FIG. 11B is a strain versus position graph generated during composite slickline cable integrity testing according to an embodiment of the present disclosure. This graph represents the entire length of composite slickline cable 802 but only the relevant portion is shown. In the illustrated example, the optical fiber has a residual strain of −600 microstrain. The curve in FIG. 11B shows relatively constant axial strain in the optical fiber with the exception of a strain variation corresponding to the damaged region shown in FIG. 11A. The curve indicates loss in the compressive residual strain in the optical fiber at the location near the damage. FIG. 11C is a signal attenuation versus position graph generated during composite slickline cable integrity testing according to an embodiment of the present disclosure. This graph represents the entire length of composite slickline cable 802 but only the relevant portion is shown. The slope of the signal attenuation is relatively constant in the optical fiber with the exception of a signal attenuation variation corresponding to the damage shown in FIG. 11A. The curve indicates an increase in signal attenuation at the location near the damaged region of composite slickline 802, which may indicate damage to the optical fiber. Following the identification of such strain and/or signal attenuation variations, the location of the anomaly is determined by optical analyzer 806 based upon timing information associated with the optical feedback from the optical fibers received by optical analyzer 806. Software or other automated or manual techniques may then be used to correlate the strain variation location in the optical fiber to the corresponding axial location along composite slickline cable 802 such that a further inspection of composite slickline cable 802 proximate the determined axial location can be conducted.

In one aspect, the present disclosure is directed to a method of optimizing residual strain in at least one optical fiber in a composite slickline cable. The method includes establishing a first strain in a plurality of reinforcing fibers responsive to the application of a first tension on the reinforcing fibers; establishing a second strain in the at least one optical fiber responsive the application of to a second tension on the at least one optical fiber; applying a polymer material to the plurality of reinforcing fibers and the at least one optical fiber at a temperature above a solidification temperature of the polymer material; solidifying the polymer material around the reinforcing fibers and the at least one optical fiber to form the composite slickline cable having a fiber reinforced polymer with the at least one optical fiber disposed therein while maintaining the first and second tensions; cooling the composite slickline cable; removing the first and second tensions; and establishing a residual strain between about −1,000 microstrain and about 500 microstrain in the at least one optical fiber when the composite slickline cable is axially unstressed.

The method may also include one or more of the following: establishing residual strain between about −1,000 microstrain and about −500 microstrain in the at least one optical fiber when the composite slickline cable is axially unstressed; establishing residual strain between about −500 microstrain and about −10 microstrain in the at least one optical fiber when the composite slickline cable is axially unstressed; establishing residual strain between about −200 microstrain and about 200 microstrain in the at least one optical fiber when the composite slickline cable is axially unstressed; establishing residual strain between about −100 microstrain and about 100 microstrain in the at least one optical fiber when the composite slickline cable is axially unstressed; establishing residual strain between about 10 microstrain and about 500 microstrain in the at least one optical fiber when the composite slickline cable is axially unstressed; placing the at least one optical fiber in contact with reinforcing fibers prior to applying the polymer material to the plurality of reinforcing fibers and the at least one optical fiber at a temperature above the solidification temperature of the polymer material; cooling the at least one optical fiber prior to placing the optical fiber in contact with reinforcing fibers; heat cycling the at least one optical fiber prior to applying the second tension to the at least one optical fiber to establish a residual compressive stress in the at least one optical fiber and/or cooling the composite slickline cable prior to removing the first and second tensions.

In another aspect, the present disclosure is directed to a composite slickline cable that includes a fiber reinforced polymer and at least one optical fiber disposed within the fiber reinforced polymer such that axial stress applied to the composite slickline cable is shared by the at least one optical fiber and the fiber reinforced polymer and such that the at least one optical fiber has a residual strain between about −1,000 microstrain and about 500 microstrain when the composite slickline cable is axially unstressed.

In some embodiments, the at least one optical fiber may have a residual strain between about −1,000 microstrain and about −500 microstrain when the composite slickline cable is axially unstressed, between about −500 microstrain and about −10 microstrain when the composite slickline cable is axially unstressed, between about −200 microstrain and about −200 microstrain when the composite slickline cable is axially unstressed, between about −100 microstrain and about 100 microstrain when the composite slickline cable is axially unstressed or between about 10 microstrain and about 500 microstrain when the composite slickline cable is axially unstressed. In any of the above embodiments, a plurality of optical fibers may be disposed within the fiber reinforced polymer such that axial stress applied to the composite slickline cable is shared by the plurality of optical fibers and the fiber reinforced polymer, the at least one optical fiber further comprises an outer jacket, the fiber reinforced polymer may be a carbon fiber reinforced thermoplastic and/or a thermoplastic coating may be disposed exteriorly on the fiber reinforced polymer.

It should be understood by those skilled in the art that the illustrative embodiments described herein are not intended to be construed in a limiting sense. Various modifications and combinations of the illustrative embodiments as well as other embodiments will be apparent to persons skilled in the art upon reference to this disclosure. It is, therefore, intended that the appended claims encompass any such modifications or embodiments.

What is claimed is:

1. A method of optimizing residual strain in at least one optical fiber in a composite slickline cable, the method comprising:
    establishing a first strain in a plurality of reinforcing fibers responsive to the application of a first tension on the reinforcing fibers;
    establishing a second strain in the at least one optical fiber responsive the application of to a second tension on the at least one optical fiber;
    applying a polymer material to the plurality of reinforcing fibers and the at least one optical fiber at a temperature above a solidification temperature of the polymer material;
    solidifying the polymer material around the reinforcing fibers and the at least one optical fiber to form the composite slickline cable having a fiber reinforced polymer with the at least one optical fiber disposed therein while maintaining the first and second tensions;
    cooling the composite slickline cable;
    removing the first and second tensions; and
    establishing a residual strain between about −1,000 microstrain and about 500 microstrain in the at least one optical fiber when the composite slickline cable is axially unstressed.

2. The method as recited in claim 1 further comprising establishing residual strain between about −1,000 microstrain and about −500 microstrain in the at least one optical fiber when the composite slickline cable is axially unstressed.

3. The method as recited in claim 1 further comprising establishing residual strain between about −500 microstrain and about −10 microstrain in the at least one optical fiber when the composite slickline cable is axially unstressed.

4. The method as recited in claim 1 further comprising establishing residual strain between about −200 microstrain and about 200 microstrain in the at least one optical fiber when the composite slickline cable is axially unstressed.

5. The method as recited in claim 1 further comprising establishing residual strain between about −100 microstrain and about 100 microstrain in the at least one optical fiber when the composite slickline cable is axially unstressed.

6. The method as recited in claim 1 further comprising establishing residual strain between about 10 microstrain and about 500 microstrain in the at least one optical fiber when the composite slickline cable is axially unstressed.

7. The method as recited in claim 1 further comprising placing the at least one optical fiber in contact with reinforcing fibers prior to applying the polymer material to the plurality of reinforcing fibers and the at least one optical fiber at a temperature above the solidification temperature of the polymer material.

8. The method as recited in claim 7 further comprising cooling the at least one optical fiber prior to placing the optical fiber in contact with reinforcing fibers.

9. The method as recited in claim 1 further comprising heat cycling the at least one optical fiber prior to applying the second tension to the at least one optical fiber to establish a residual compressive stress in the at least one optical fiber.

10. The method as recited in claim 1 further comprising cooling the composite slickline cable prior to removing the first and second tensions.

11. A composite slickline cable comprising:
    a fiber reinforced polymer; and
    at least one optical fiber disposed within the fiber reinforced polymer such that axial stress applied to the composite slickline cable is shared by the at least one optical fiber and the fiber reinforced polymer;
    wherein, the at least one optical fiber has a residual strain between about −1,000 microstrain and about 500 microstrain when the composite slickline cable is axially unstressed.

12. The composite slickline cable as recited in claim 11 wherein the at least one optical fiber has a residual strain between about −1,000 microstrain and about −500 microstrain when the composite slickline cable is axially unstressed.

13. The composite slickline cable as recited in claim 11 wherein the at least one optical fiber has a residual strain between about −500 microstrain and about −10 microstrain when the composite slickline cable is axially unstressed.

14. The composite slickline cable as recited in claim 11 the at least one optical fiber has a residual strain between about −200 microstrain and about 200 microstrain when the composite slickline cable is axially unstressed.

15. The composite slickline cable as recited in claim 11 wherein the at least one optical fiber has a residual strain between about −100 microstrain and about 100 microstrain when the composite slickline cable is axially unstressed.

16. The composite slickline cable as recited in claim 11 wherein the at least one optical fiber has a residual strain between about 10 microstrain and about 500 microstrain when the composite slickline cable is axially unstressed.

17. The composite slickline cable as recited in claim 11 further comprising a plurality of optical fibers disposed within the fiber reinforced polymer such that axial stress applied to the composite slickline cable is shared by the plurality of optical fibers and the fiber reinforced polymer.

18. The composite slickline cable as recited in claim 11 wherein the at least one optical fiber further comprises an outer jacket.

19. The composite slickline cable as recited in claim 11 wherein the fiber reinforced polymer further comprises a carbon fiber reinforced thermoplastic.

20. The composite slickline cable as recited in claim 11 further comprising a thermoplastic coating disposed exteriorly on the fiber reinforced polymer.

* * * * *